(12) United States Patent
Yoo et al.

(10) Patent No.: US 8,668,139 B2
(45) Date of Patent: Mar. 11, 2014

(54) METHOD OF PROTECTING AN INDIVIDUAL'S PRIVACY WHEN PROVIDING SERVICE BASED ON ELECTRONIC TAG

(71) Applicant: Electronics and Telecommunications Research Institute, Daejeon-si (KR)

(72) Inventors: Sang-Keun Yoo, Chungcheongnam-do (KR); Jun-Seob Lee, Daejeon-si (KR); Yong-Woon Kim, Chungcheongnam-do (KR); Hyoung-Jun Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/886,524

(22) Filed: May 3, 2013

(65) Prior Publication Data

US 2013/0247140 A1    Sep. 19, 2013

Related U.S. Application Data

(62) Division of application No. 12/775,837, filed on May 7, 2010, now Pat. No. 8,459,541.

(30) Foreign Application Priority Data

May 8, 2009    (KR) .................. 10-2009-0040148

(51) Int. Cl.
*G06F 17/00*    (2006.01)
*G08B 13/14*    (2006.01)

(52) U.S. Cl.
USPC .................. 235/375; 340/5.85; 340/572.1

(58) Field of Classification Search
USPC ............... 235/375, 492, 382, 451; 340/572.1, 340/10.1, 10.3, 10.4–10.42, 10.51, 10.52, 340/5.6, 5.61
See application file for complete search history.

(56) References Cited

U.S. PATENT DOCUMENTS 7,911,346 B1    3/2011    Claudatos et al.
8,289,135 B2    10/2012    Griffin
(Continued)

FOREIGN PATENT DOCUMENTS

KR    10-065371    12/2006
KR    10-2007-0021877    2/2007
(Continued)

OTHER PUBLICATIONS

U.S. Patent Restriction Requirement mailed Jan. 30, 2012 in corresponding U.S. Appl. No. 12/775,837.

(Continued)

*Primary Examiner* — Michael G Lee
*Assistant Examiner* — Suezu Ellis
(74) *Attorney, Agent, or Firm* — Staas & Halsey LLP

(57) ABSTRACT

A technology for providing a service based on an electronic tag. A personalized service provider issues a new code that replaces a code recorded on an electronic tag which is attached to a product purchased by a purchaser, sets a privacy policy of the purchaser, authenticates the new code and purchaser information, and provides a service associated with the product in a limited manner according to the set privacy policy when a person who accesses the personalized service provider is not the purchaser of the product.

3 Claims, 3 Drawing Sheets

(56) References Cited

U.S. PATENT DOCUMENTS

| | | |
|---|---|---|
| 2006/0049944 A1 | 3/2006 | Ishiguro et al. |
| 2007/0040654 A1 | 2/2007 | Lee et al. |
| 2008/0204199 A1 | 8/2008 | Howarth et al. |
| 2008/0218316 A1* | 9/2008 | Marques et al. ........... 340/10.52 |
| 2009/0115600 A1 | 5/2009 | Lee et al. |
| 2010/0201489 A1 | 8/2010 | Griffin |
| 2010/0214080 A1 | 8/2010 | Alexis |
| 2010/0277279 A1 | 11/2010 | Kim et al. |

FOREIGN PATENT DOCUMENTS

| | | |
|---|---|---|
| KR | 10-0819048 | 4/2008 |
| KR | 10-0826282 | 4/2008 |
| WO | WO 2009075521 A2 * | 6/2009 |

OTHER PUBLICATIONS

U.S. Patent Office Action mailed May 9, 2013 in corresponding U.S. Appl. No. 12/775,837.

U.S. Appl. No. 12/775,837, filed May 7, 2010, Sang-Keun Yoo et al., Electronics and Telecommunications Research Institute.

U.S. Patent Final Office Action mailed Oct. 24, 2012 in corresponding U.S. Appl. No. 12/775,837.

U.S. Patent Notice of Allowance mailed Feb. 8, 2013 in corresponding U.S. Appl. No. 12/775,837.

* cited by examiner

METHOD OF PROTECTING AN INDIVIDUAL'S PRIVACY WHEN PROVIDING SERVICE BASED ON ELECTRONIC TAG

CROSS-REFERENCE TO RELATED APPLICATIONS

This application is a U.S. divisional application filed under 37 CFR 1.53(b) claiming priority benefit of U.S. Ser. No. 12/775,837 filed in the United States on May 7, 2010, which claims foreign priority benefit to Korean Patent Application No. 10-2009-0040148 filed with the Korean Intellectual Property Office on May 8, 2009, the disclosures of which are incorporated herein by reference.

BACKGROUND

1. Field

The following description relates to a service using an electronic tag, and more particularly, to a technology for protecting the privacy of a user in an environment in which a service is provided to the user using an electronic tag.

2. Description of the Related Art

Identification technology using electronic tags is based on technologies such as radio frequency identification (RFID) and the like. Unlike barcodes, electronic tags make it possible for an object to be identified at a distance. Thus, the identification technology using electronic tags provides opportunities for anyone to obtain information about an individual's product (e.g., information about the product itself, distribution and sales information, etc.) having an electronic tag attached thereto. That is, when an individual possesses a product having an electronic tag attached thereto, his or her privacy is at a risk of being exposed to the public. To prevent this side effect, when an individual purchases a product having an electronic tag attached thereto, the electronic tag may be disabled to protect the privacy of the individual. However, if the electronic tag is disabled, it is not possible to provide additional services using the electronic tag attached to the product.

SUMMARY

It is an objective of the present invention to provide a technical solution for protecting an individual's privacy without disabling an electronic tag. In particular, it is an objective of the present invention to provide a technical solution for protecting an individual's privacy without affecting a conventional service provision process using an electronic tag.

In one general aspect, there is provided a method in which a personalized service provider protects an individual's privacy when providing a service based on an electronic tag. The method includes: assigning a new code to an electronic tag attached to a product; setting a privacy policy for a service associated with the product which is assigned the new code; and providing the service associated with the product, which is assigned the new code, according to the set privacy policy.

The assigning of the new code may include: receiving user information and a personalized service setting request, which contains a code, from a communication terminal of a user which read the code stored in the electronic tag; issuing the new code which will replace the received code; sending the new code to the communication terminal so that the communication terminal can record the new code on the electronic tag; and associating the new code, the user information, and the service associated with the product with one another and maintaining information about this association.

The method may further include registering the new code and address information, which is needed to provide the service associated with the product assigned the new code, with a code interpreter.

The providing of the service may include: obtaining the address information from the code interpreter based on the new code and authenticating whether a person who accesses the personalized service provider is the user; and providing the service associated with the product in a limited manner according to the set privacy policy when the person is not the user.

In another aspect, there is provided a method in which a communication terminal of a user protects an individual's privacy when providing a service based on an electronic tag. The method includes: replacing a code stored in an electronic tag, which is attached to a product, with a new code; and setting a privacy policy for a service associated with the product, wherein a personalized service provider which provides a personalized service associated with the product, associates the product with the new code and maintains information about this association.

The replacing of the code stored in the electronic tag with the new code includes: reading the code from the electronic tag attached to the product; accessing the personalized service provider; sending user information and the code to the personalized service provider and requesting the personalized service provider to issue the new code; receiving the issued new code, which will replace the code, from the personalized service provider; and recording the received new code on the electronic tag.

Other features and aspects will be apparent from the following detailed description, the drawings, and the claims

Figure 1:
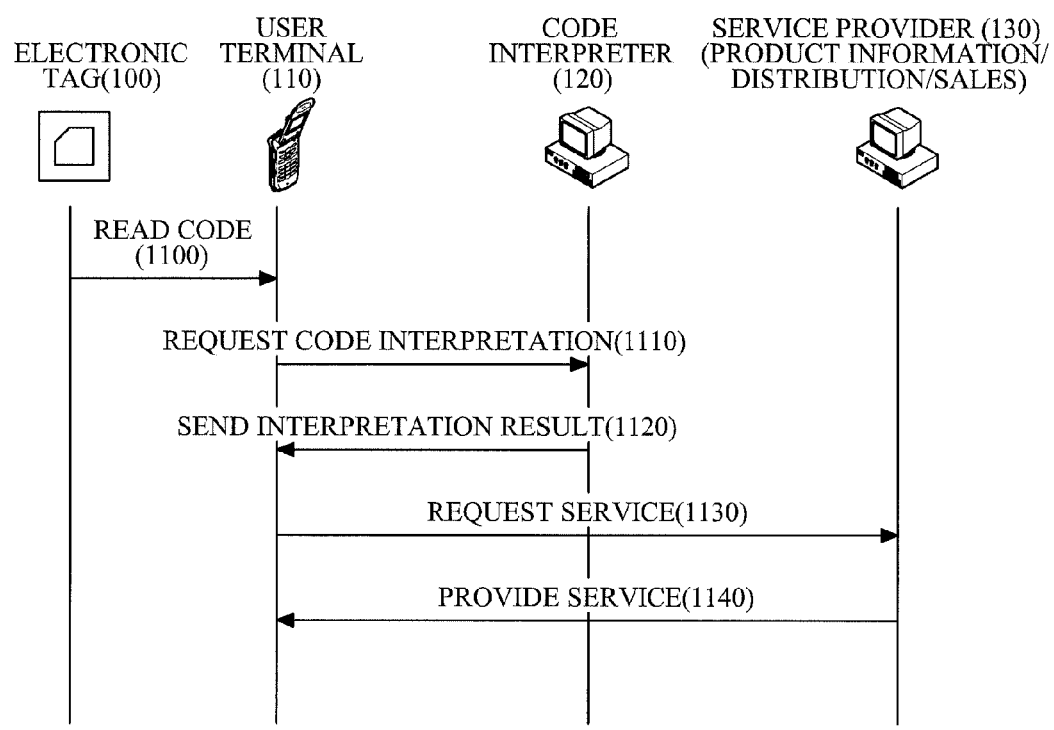
FIG. 1 is a flowchart illustrating a conventional procedure for providing a service based on an electronic tag.

Throughout the drawings and the detailed description, unless otherwise described, the same drawing reference numerals will be understood to refer to the same elements, features, and structures. The relative size and depiction of these elements may be exaggerated for clarity, illustration, and convenience.

DESCRIPTION OF EMBODIMENTS

The above and other features and advantages of the present invention will become more apparent by describing exemplary embodiments thereof with reference to the attached drawings. Exemplary embodiments of the present invention will now be described in detail so that they can be readily understood and applied by those skilled in the art.

FIG. 1 is a flowchart illustrating a conventional procedure for providing a service based on an electronic tag.

Referring to FIG. 1, a user terminal 110 reads a unique code from an electronic tag 100 attached to a product (1100). Then, the user terminal 110 sends a portion of the read code to an external code interpreter 120 and requests the code interpreter 120 to interpret the portion of the code (1110). Here, the portion of the code, which is sent to the code interpreter 120, should be a number by which the type of the product having the electronic 100 can be identified. In addition, the code is a unique number by which the product having the electronic tag 100 can be identified. After receiving the portion of the code from the user terminal 110, the code interpreter 120 interprets the received portion of the code and identifies address information of a service provider 130 that provides a service associated with the product. Here, 'a service associated with the product' denotes a service of providing product information, distribution and sales information, and the like. The address information of the service provider 130 may be a uniform resource locator (URL) thereof.

The coder interpreter 120 sends the identified address information of the service provider 130 to the user terminal 110 (1120). Then, the user terminal 110 accesses the service provider 130 using the address information received from the code interpreter 120, sends the whole code read from the electronic tag 100 to the service provider 130, and requests the service provider 130 to provide the service associated with the product (1130). The service provider 130 receives the whole code from the user terminal 110 and identifies the product having the electronic tag 100 by using the received code. Then, the service provider 130 retrieves information about the identified product (such as product information or distribution and sales information) from a database therein and sends the retrieved information to the user terminal 110 (1140). Accordingly, the user terminal 110 displays the information received from the service provider 130 on its user interface. In this way, a user is provided with the service related to the product.

Electronic tags, by their nature, have a security function for a writing operation, but not for a reading operation. This means that not only the person who purchased the product but also a person who did not purchase the product can obtain the code information from the electronic tag 100 attached to the product by using their terminals. That is, even a person who did not purchase the product can obtain the code information from the electronic tag 100, send a query to the code interpreter 120 about the address information of the service provider 130 (e.g., a web page) that provides the service associated with the product, obtain the address information of the service provider 130 from the code interpreter 120, access the service provider 130 using the obtained address information, and receive the service associated with the product. Ultimately, since even a third party can use the service associated with the product purchased by the user, an individual's privacy cannot be protected by the process illustrated in FIG. 1.

Figure 2:
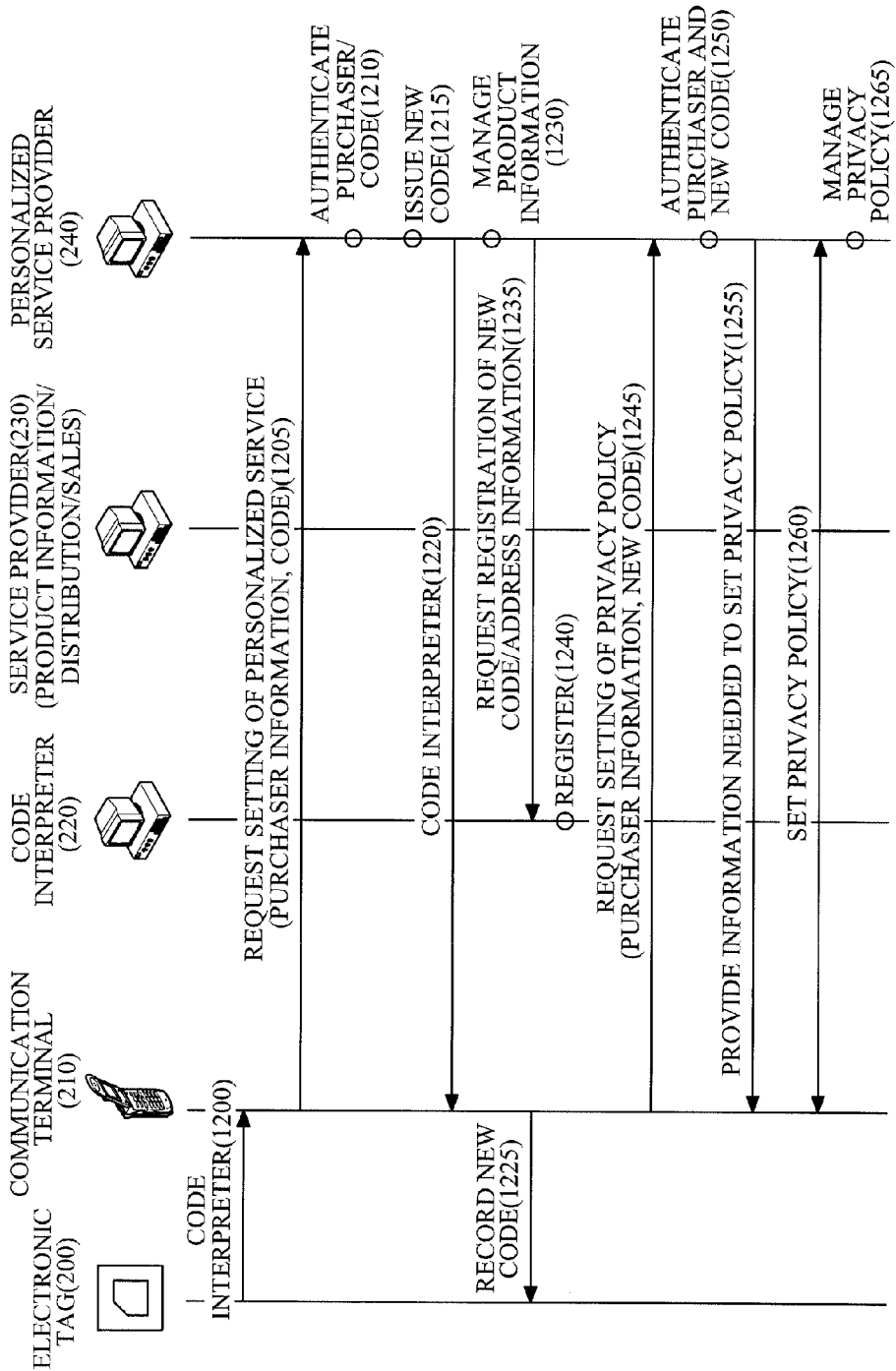
FIG. 2 is a flowchart an example procedure for setting a privacy policy to protect an individual's privacy.

FIG. 2 is a flowchart illustrating an example procedure for setting a privacy policy to protect an individual's privacy.

An electronic tag 200 may be a radio-frequency identification (RFID) tag. A unique code by which the electronic tag 200 can be identified is recorded on an internal memory of the electronic tag 200. The electronic tag 200 is attached to a product and used to identify the product. A communication terminal 210 is a portable terminal carried by a user. In FIG. 2, the user is limited to a 'purchaser' and will be referred to as such. The communication terminal 210 includes a reader that can read a code recorded on the electronic tag 200. In addition, the communication terminal 210 includes software and hardware components that can access an external network and wirelessly communicate with an external communication device. A code interpreter 220 associates a portion of each code with corresponding address information and maintains information about the associations. The code interpreter 220 receives a portion of a code from the communication terminal 210 and sends address information corresponding to the received portion of the code to the communication terminal 210. A service provider 230 is typically operated by a manufacturer or a distributor and retailer of products. The service provider 230 plays the same role as the service provider 130 illustrated in FIG. 1.

A personalized service provider 240 is an addition to the construction of the system illustrated in FIG. 1. The personalized service provider 240 is similar to the service provider 230 in that it provides a service related to a product. However, the personalized service provider 240 does not simply provide a service related to a product. It provides a service according to a privacy policy for each individual. Specifically, the personalized service provider 240 issues a new code, which will replace the code recoded on the electronic tag 200, to the purchaser, associates the new code with the purchaser, and maintains information about this association. Accordingly, the personalized service provider 240 personalizes a service, that is, provides a service according to a privacy policy for the purchaser.

In the current example, the personalized service provider 240 is separate from the service provider 230, as shown in FIG. 2. However, the service provider 230 may also play the role of the personalized service provider 240. That is, the personalized service provider 240 may not be implemented as a separate device from the service provider 230. Specifically, while the service provider 230 is operated by a manufacturer or a distributor and a retailer of products, it may be more common for a third party to operate the personalized service provider 240. By taking this consideration into account, the personalized service provider 240 is illustrated as a separate device in FIG. 2. However, the personalized service provider 240 is not necessarily implemented as a separate device. The service provider 230 may also play the role of the personalized service provider 240.

The suggested procedure for setting a privacy policy to protect an individual's privacy will now be described in detail with reference to FIG. 2. Referring to FIG. 2, the communication terminal 210 of the purchaser reads the code from the electronic tag 200 attached to the product purchased by the purchaser (1200). The communication terminal 210 generates a personalized service setting request message which includes the code and information about the purchaser and sends the personalized service setting request message to the personalized service provider 240 (1205). Here, the communication terminal 210 may have address information (e.g., www.abc.com) of the personalized service provider 240 stored in advance. For example, the purchaser may have subscribed to a personalized service according to an exemplary embodiment of the present invention, downloaded the address information of the personalized service provider 240 at the time of subscribing to the personalized service, and stored the address information in the communication terminal 210. If the address information is not stored in the communication terminal 210, the purchaser may enter the URL of the personalized service provider 240 and then send the personalized serving setting request message.

The personalized service provider 240 receives the personalized service setting request message from the communication terminal 210. Then, the personalized service provider 240 extracts the code and the information about the purchaser from the received personalized service setting request message and authenticates the purchaser and/or the code (1210). Information used to authenticate the purchaser may be provided to the personalized service provider 240 when the purchaser subscribes to the personalized service and may be managed by the personalized service provider 240. In addition, information used to authenticate the code may be received from the service provider 230.

If the authentication of the purchaser and/or the code is successful, the personalized service provider 240 issues a new code that will replace the code received in 1205 (1215) and sends the new code to the communication terminal 210 (1220). The communication terminal 210 receives the new code from the personalized service provider 240 and records the new code on the electronic tag 200 according to the purchaser's manipulation (1225). At this time, the previous code stored in the electronic tag 200 may be deleted. Accordingly, the communication terminal 210 overwrites the old code on the electronic tag 200 with the new code. Since the electronic tag 200 may have a security function for a writing operation, the purchaser can record the new code on the electronic tag 200 only after entering a correct password. The password may be managed by a manufacturer of the product. Thus, the old code recorded on the electronic tag 200 can be replaced by the new code only after the purchase of the product has actually been made.

Meanwhile, the personalized service provider 240 associates the purchaser information, the new code, and a service associated with the product having the electronic tag 200 with one another and maintains information about this association in its database (1230). Here, 'a service associated with the product' may be product information, distribution and sales information, etc. which are provided by the service provider 230. The service associated with the product may also include information newly created by the purchaser. Service items for the product are not limited and can be designated, modified and deleted by the purchaser.

The personalized service provider 240 requests the code interpreter 220 to register the new code and address information (e.g., www.abc.com/1234567) of a web page that provides the service associated with the product associated with the new code (1235). Accordingly, the code interpreter 220 registers the new code and the address information (1240). That is, the code interpreter 220 associates the new code with the address information and maintains information about this association in its database.

Meanwhile, the communication terminal 210 requests the personalized service provider 240 to set a privacy policy (1245). In 1245, the purchaser information and the new code are sent to the personalized service provider 240. The personalized service provider 240 authenticates the purchaser and the new code (1250). When the purchaser and the new code are successfully authenticated, the personalized service provider 240 provides information needed to set the privacy policy to the communication terminal 210 (1255). For example, the personalized service provider 240 may provide a list of service items related to the product and allow the purchaser to designate each of the service items as 'private' or 'public.' The personalized service provider 240 sets the privacy policy according to the designation of the purchaser (1260) and maintains information about the set privacy policy in its database (1265). Here, the privacy policy may be set for each product or each group of products. That is, the privacy policy is not necessarily set for each product. The operation in which the communication terminal 210 requests the personalized service provider 240 to set a privacy policy is illustrated as a separate operation in FIG. 2. However, this operation may also be performed together with the personalized service setting request.

Figure 3:
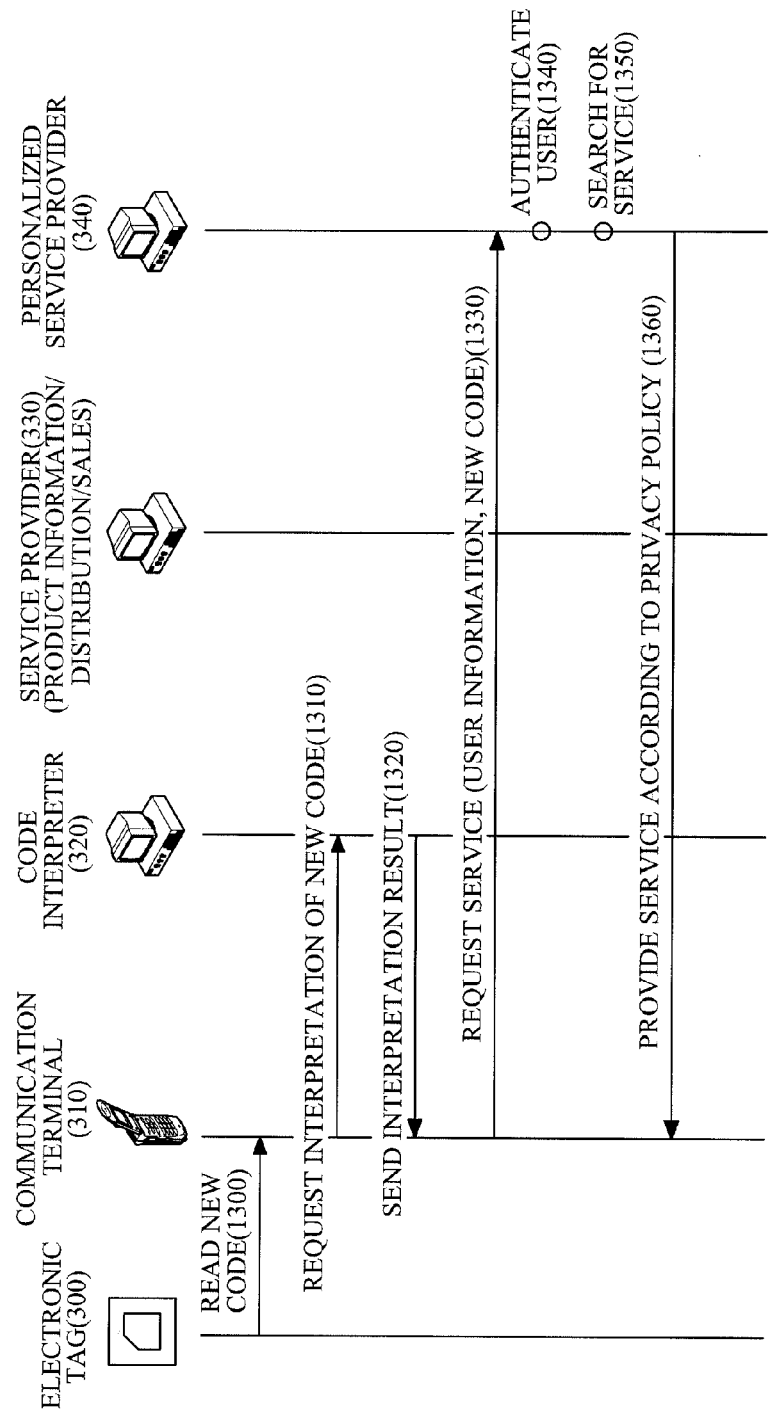
FIG. 3 is a flowchart illustrating an example procedure for providing a service according to a set privacy policy.

FIG. 3 is a flowchart illustrating an example procedure for providing a service according to a set privacy policy.

Referring to FIG. 3, a communication terminal 310 recognizes an electronic tag 300 attached to a product and reads a new code from the electronic code 300 (1300). Then, the communication terminal 310 sends a portion of the new code to a code interpreter 320 and requests the code interpreter 320 to interpret the portion of the new code (1310). Here, the portion of the new code should be a number by which the product can be identified. Typically, the portion of the new code sent to the code interpreter 320 is a portion up to an item level of the new code by which the type of the product can be identified. The code interpreter 320 receives the portion of the new code, that is, up to the item level. The code interpreter 320 interprets the received portion of the new code and sends address information corresponding to the interpretation result to the communication terminal 310 (1320).

The communication terminal 310 accesses a personalized service provider 340 using the address information (e.g., www.abc.com/1234567) received from the code interpreter 320, sends user information and the new code to the personalized service provider 340, and requests the personalized service provider 340 to provide a service (1330). Here, the communication terminal 310 sends the whole of the new code to the personalized service provider 340. That is, the whole of the new code is sent to the personalized service provider 340, up to a serial level by which even a serial number of the product can be identified. The personalized service provider 340 authenticates a user based on the user information received in 1330 (1340). The personalized service provider 340 searches for a service using the new code received in 1330 (1350) and, if the user is successfully authenticated, provides the service according to a set privacy policy (1360). Specifically, if the user information does not match information about an actual purchaser of the product associated with the new code, the personalized service provider 340 checks the set privacy policy and provides service items set to 'public' to the communication terminal 310 according to the privacy policy. If the user information matches the information about the actual purchaser, the personalized service provider 340 provides all service items for the product associated with the new code to the communication terminal 310.

According to the present invention, privacy invasion resulting from scanning of a product having an electronic tag attached thereto can be prevented. In particular, since a new code for a personalized service is newly issued, the possibility of privacy invasion based on a code previously stored in the electronic tag is completely eliminated. Furthermore, an individual's privacy can be protected without requiring a modification to a standardized service provision process.

Also, a user can easily set his or her privacy policy while checking the content of a service.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention

What is claimed is:

1. A method in which a communication terminal of a user protects an individual's privacy when providing a service based on an electronic tag, the method comprising:
    replacing a code stored in an electronic tag, which is attached to a product, with a new code; and
    setting a privacy policy for a service associated with the product, wherein a personalized service provider which provides the service associated with the product, associates the product with the new code and maintains information about this association, wherein the replacing of the code stored in the electronic tag with the new code comprises:

reading the code from the electronic tag attached to the product;

accessing the personalized service provider;

sending user information and the code to the personalized service provider and requesting the personalized service provider to issue the new code;

receiving the issued new code, which will replace the code, from the personalized service provider; and recording the received new code on the electronic tag.

2. The method of claim 1, wherein in the recording of the received new code on the electronic tag, the code stored in the electronic tag is overwritten with the new code.

3. The method of claim 2, wherein in the setting of the privacy policy, at least one item that forms the service is set to private at the request of the user.

* * * * *